(12) United States Patent
Zorn (10) Patent No.: US 10,627,342 B2
(45) Date of Patent: Apr. 21, 2020

(54) COLORIMETER ATTACHMENT FOR SMART PHONE

(71) Applicant: WiSys Technology Foundation, Inc., Madison, WI (US)

(72) Inventor: Michael Edward Zorn, Green Bay, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 0 days.

(21) Appl. No.: 16/042,065

(22) Filed: Jul. 23, 2018

(65) Prior Publication Data

US 2019/0025197 A1    Jan. 24, 2019

Related U.S. Application Data

(60) Provisional application No. 62/535,551, filed on Jul. 21, 2017.

(51) Int. Cl.
| | | |
|---|---|---|
| *G01N 21/25* | (2006.01) | |
| *H04M 1/02* | (2006.01) | |
| *G01N 21/31* | (2006.01) | |
| *G02B 5/28* | (2006.01) | |
| *G01N 21/51* | (2006.01) | |
| *G01N 21/64* | (2006.01) | |
| *G01N 21/27* | (2006.01) | |

(52) U.S. Cl.
CPC ......... *G01N 21/251* (2013.01); *G01N 21/255* (2013.01); *G01N 21/314* (2013.01); *H04M 1/0264* (2013.01); *G01N 21/274* (2013.01); *G01N 21/51* (2013.01); *G01N 21/645* (2013.01); *G01N 2021/3148* (2013.01); *G01N 2201/0221* (2013.01); *G02B 5/28* (2013.01)

(58) Field of Classification Search
CPC .................................................... G01N 21/251
USPC ................................................. 356/426, 416
See application file for complete search history.

(56) References Cited

U.S. PATENT DOCUMENTS

| | | | |
|---|---|---|---|
| 9,068,887 B1 * | 6/2015 | Bennouri | G01J 1/429 |
| 9,547,899 B1 * | 1/2017 | Pyayt | G06K 9/00134 |
| 2007/0188759 A1 * | 8/2007 | Mehendale | G01N 21/251 356/409 |
| 2013/0021611 A1 * | 1/2013 | Tsurutani | G01J 3/02 356/416 |
| 2013/0157351 A1 * | 6/2013 | Ozcan | G01N 21/6486 435/288.7 |
| 2014/0120563 A1 * | 5/2014 | Ozcan | G01N 21/274 435/7.94 |

(Continued)

*Primary Examiner* — Tarifur R Chowdhury
*Assistant Examiner* — Omar H Nixon
(74) *Attorney, Agent, or Firm* — Boyle Fredrickson S.C.

(57) ABSTRACT

A colorimeter accessory for a smartphone is provided that, by leveraging the high-volume development of sophisticated smart phone technology, substantially reduces the cost of a colorimeter. The invention provides a sample holder that adapts to a range of smart phone cameras and that provides a light source and interference filter necessary for making accurate narrowband measures of light transmission through the sample holder. A correction system operates to compensate for characteristics of the smart phone camera that can affect accuracy of the reading. The processing system of the smart phone may be enlisted for this correction system and for calculation of concentrations of solution through the measurements that are made.

20 Claims, 4 Drawing Sheets

(56) References Cited

U.S. PATENT DOCUMENTS

2014/0267664 A1\* 9/2014 Gross ................. G06K 9/00362
                                                        348/77
2017/0094130 A1\* 3/2017 Kishi ................... H04N 1/6033
2018/0048788 A1\* 2/2018 Hayashi ................. G01K 11/12

\* cited by examiner

FIG. 8d

COLORIMETER ATTACHMENT FOR SMART PHONE

CROSS REFERENCE TO RELATED APPLICATION

This application claims the benefit of U.S. provisional application 62/535,551, filed Jul. 21, 2017, and hereby incorporated by reference.

STATEMENT REGARDING FEDERALLY SPONSORED RESEARCH OR DEVELOPMENT

--

BACKGROUND OF THE INVENTION

The present invention relates to optical instrumentation, for example, for educational purposes, and in particular to a high accuracy colorimeter attachment for cell phones and the like.

Colorimeters measure the absorbance of specific colors, for example, to determine concentrations of chemical solutions using Beer's law relating the absorbance of a color directly to concentration of the solution.

Accurate colorimeters can be extremely costly thus precluding their use in educational applications or other situations where costs are an obstacle.

SUMMARY OF THE INVENTION

The present invention provides a colorimeter accessory for a smartphone that, by leveraging the high-volume development of sophisticated smart phone technology, substantially reduces the cost of a colorimeter. The invention provides a sample holder that adapts to a range of cameras and that provides a light source and interference filter necessary for making accurate narrowband measures of light transmission through the sample holder. A correction system operates to compensate for characteristics of the smart phone camera that can affect accuracy of the reading. The processing system of the smart phone may be enlisted for this correction system and for calculation of concentrations of solution through the measurements that are made.

In one embodiment, the present invention provides a colorimeter accessory for a personal electronic device of a type having a housing with a front or rear face carrying a camera lens having an optical axis extending forward from the camera lens. The colorimeter accessory includes an adapter for securing the accessory to the housing of the personal electronic device; a lens cover supported by the adapter and surrounding the camera lens to provide a compartment around the camera lens; a transparent liquid holder supported by the lens cover and positioned in front of the camera lens along the optical axis; an interference filter received into the lens cover and positioned in front of the camera lens along the optical axis; and a light source positioned in front of the camera lens, transparent liquid holder and interference filter and providing light along the optical axis.

It is thus a feature of at least one embodiment of the invention to leverage convenient camera processing of smart phones for reliable colorimeter readings.

The compartment around the camera lens may be sealed against light leakage between the camera lens and the housing. The housing may provide an elastomeric material contacting the front face of the portable electronic device to seal the housing surrounding the camera lens. The housing may be constructed of an opaque thermoplastic material.

It is thus a feature of at least one embodiment of the invention to prevent light leakage into the housing affecting light transmission readings of the smart phone's camera lens.

The adapter may be secured to the housing of the personal electronic device such that a display screen of the personal electronic device is not obscured.

It is thus a feature of at least one embodiment of the invention to allow the touch display screen of the smart phone to be used by the user during colorimeter measurements and view immediate feedback displayed on the screen.

A part of the adapter contacting the personal electronic device may be comprised of a nonconductive material.

It is thus a feature of at least one embodiment of the invention that contact of the adapter with the phone does not affect touch screen sensors.

The adapter may be adjustably secured to the housing of the personal electronic device vertically between a top and bottom of the personal electronic device to the bottom of the personal electronic device and across the personal electronic device from left to right.

It is thus a feature of at least one embodiment of the invention to allow the adapter to adjust to different smart phone housing sizes and positions of the camera.

The adapter may be spring loaded to press the lens cover against the front face of the housing of the personal electronic device. The adapter may be a spring-tensioned clip having a first arm extending downward over a rear face of the portable electronic device and a second arm extending downward over a front face of the portable computer device and supporting the housing. The first arm may provide a gripping pad of material contacting the rear face and to prevent movement between the adapter and the portable computer device.

It is thus a feature of at least one embodiment of the invention to allow the adapter to be spring clipped onto the smart phone in a narrow form factor around the camera between the back and front of the phone housing without additional adjustment screws to the sides of the phone housing so as to not interfere with other buttons, ports or functionality of the smart phone such as speakers and rear facing cameras.

The transparent liquid holder may provide parallel planar front and rear surfaces positionable perpendicular to the optical axis. The transparent liquid holder may be removable through an opening of the housing.

It is thus a feature of at least one embodiment of the invention to allow preloading of liquid samples into the liquid holders before installing them into the adapter for ease and improved consistency. The transparent liquid holder is constructed so as to minimize any effect on the transmission of light therethrough.

The interference filter may be removable through an opening of the housing.

It is thus a feature of at least one embodiment of the invention to easily interchange filters as necessary for the particular light conditions and liquid sample.

The light source may emit continuous light over an entire visible light spectrum.

It is thus a feature of at least one embodiment of the invention to permit red, green and blue sensitivities read by the smart phone camera to provide colorimeter measurement.

The housing may support a battery providing power to the light source, the power to the light source controlled by a switch operable to connect and disconnect power to the light source.

It is thus a feature of at least one embodiment of the invention to allow the adapter to be installed onto the smart phone and remain mobile without being tethered to a power source.

The portable computer device may be a smart phone having a display, cell phone transceiver circuitry, and battery.

Another embodiment of the present invention provides a method of determining a concentration of a solute material in solution including the step of providing a colorimeter including an adapter for securing the accessory to a front or rear face of a portable computer device, the front face carrying a camera lens having an optical axis extending forward from the camera lens; a housing supported by the adapter and surrounding the camera lens to provide a compartment around the camera lens; a transparent liquid holder received into the housing and positioned in front of the camera lens along the optical axis; an interference filter received into the housing and positioned in front of the camera lens along the optical axis; and a light source positioned in front of the camera lens, transparent liquid holder and interference filter and providing light along the optical axis; securing the adapter on the portable computer device wherein the housing surrounds the camera lens of the front face of the portable computer device. The method further includes the steps of taking a blank exposure with the camera lens when the sample holder is without the solute material in solution to be measured; taking a sample exposure with the camera lens when the sample holder is filled with the solute material in solution to be measured; and outputting a concentration of the solute material to the portable computer device.

The concentration of the solute material may be determined by comparing the band of frequencies through the interference filter to a response curve that is a function of red, green and blue color sensitivities of the interference filter on sensing pixels of the camera lens.

It is thus a feature of at least one embodiment of the invention to mimic results of a spectrometer that takes continuous frequency measurements with a phone camera that detects only three color bands (red, green and blue).

These particular objects and advantages may apply to only some embodiments falling within the claims and thus do not define the scope of the invention.

DETAILED DESCRIPTION OF THE PREFERRED EMBODIMENT

Figure 1:
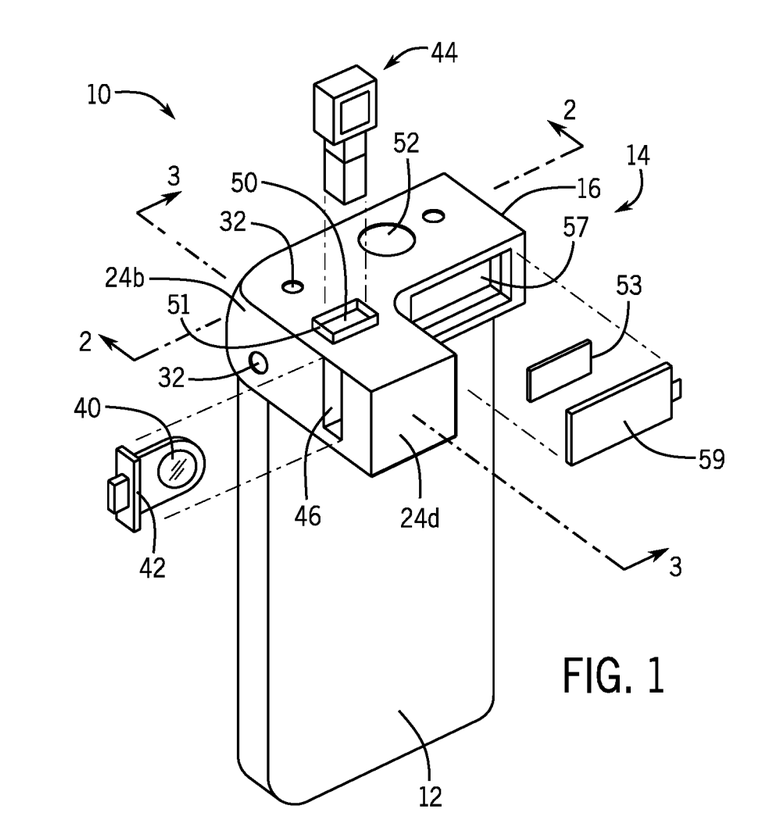
FIG. 1 is a perspective view of an example smart phone fitted with one embodiment of the colorimeter accessory of the present invention.
Figure 2:
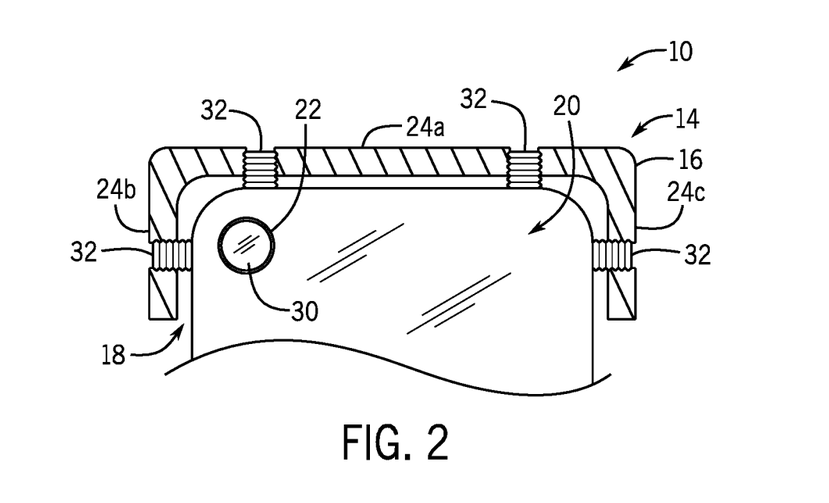
FIG. 2 is a cross-section taken along line 2-2 of FIG. 1 showing one option for adapting the accessory to a different camera.

Referring now to FIGS. 1 and 2, a colorimeter 10 may employ a standard smart phone 12 fitted with a colorimeter adapter 14. An example smart phone 12 is the iPhone brand phone available from Apple Inc. of Cupertino, Calif. It is also understood that the colorimeter 10 may be employed with a portable computer such as a tablet computer. An example tablet computer is the iPad brand table computer also available from Apple Inc. of Cupertino, Calif. The colorimeter 10 can be used with any processor-based personal electronic device (such as a smartphone or tablet computer) that has the combined functionalities of a portable media player and a cellular telephone. The device may support a variety of applications, such as a telephone application, a video conferencing application, an e-mail application, an instant messaging application, a blogging application, a digital camera application, a digital video camera application, a web browsing application, a digital music player application, and/or a digital video player application. The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

As will generally be understood in the art, the smart phone 12 may include an internal processor and memory capable of executing a stored application program and operating to read inputs from various components of the smart phone 12 including a high resolution color camera and to receive inputs and provide outputs to a touchscreen of the type well understood in the art to communicate with a user. The smart phone 12 may have an outer case, transceiver circuitry, and antennas housed within for handling wireless communications. The case may be formed of any suitable materials including, plastic, glass, ceramics, metal, or other suitable materials, or a combination of these materials. The case may support a liquid crystal display (LCD), an organic light emitting diode (OLED) display, or any other suitable display that may have touch screen functionality integrated into the display. Other input-output devices of the smart phone 12 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling the smart phone 12. If desired, smart phone 12 can be controlled remotely (e.g., using an infrared remote control, a radio-frequency remote control such as a Bluetooth® remote control, etc.). Smart phone 12 may also include ports such as ports with pins for receiving data and power signals, audio and video jacks, power jacks, etc.

The adapter 14 may provide a housing 16 having an upwardly extending slot 18 for receiving an upper end 20 of the smart phone 12 such as to support a lens 22 of a forward-looking camera, for example, at an upper left edge of the smart phone 12. It is understood that the camera may be on either side of the housing 16, for example, on the front or rear of the camera housing 16 to be front facing or rear facing with respect to the touch screen.

Figure 3:
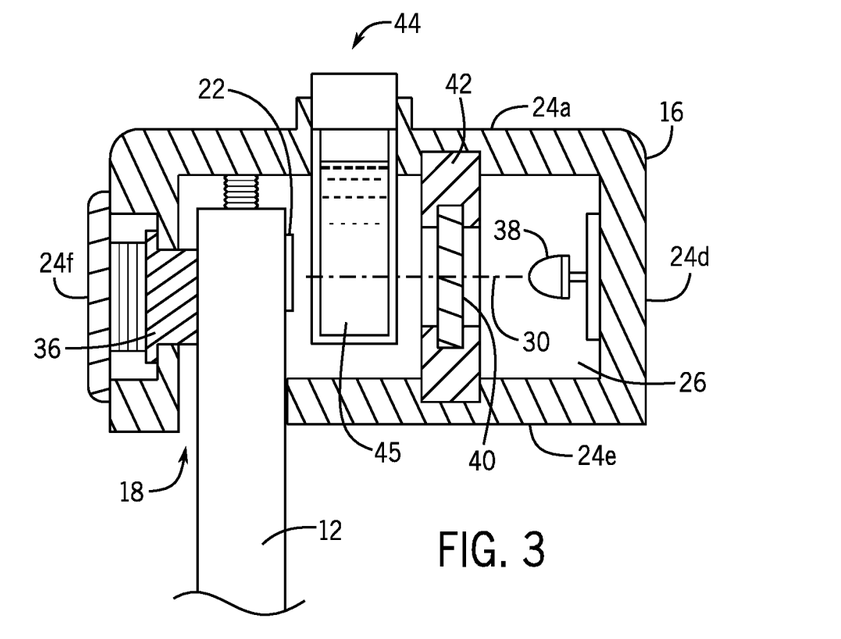
FIG. 3 is a cross-section taken along line 3-3 of FIG. 1 showing the optical path provided by the present invention from a contained light source through an interference filter and a sample holder to the camera lens of the smart phone.

Referring now also to FIG. 3, the housing 16 provides a generally horizontal upper wall 24a that may rest proximate to an upper edge of the smart phone 12 when the smart phone 12 is held with a broad face of the smart phone 12 vertical. Left and right housing walls 24b and 24c may then extend proximate to the left and right edges of the smart phone 12 and define left and right edges of the slot 18. An optical axis 30 of the lens 22 faces forward extending beneath and parallel to a lower surface of the upper wall 24a toward a front wall 24d of the housing 16, the latter extending downward from a front edge of the upper wall 24a. Attached to the lower edge of the front wall 24d and of the sidewalls 24b and 24c is a bottom wall 24e extending horizontally toward a front face of the cell phone 12 beneath the optical axis 30. Together the top wall 24a, left and right sidewalls 24b and 24c, bottom wall 24e and front wall 24d provide a light tight compartment 26 surrounding the camera lens 22. In this regard, each of these walls 24 is constructed, for example, of an opaque dark thermoplastic material.

On an opposite side of the smart phone 12, a rear wall 24f of the housing 16 may extend downward over a rear face of the smart phone 12. This rear wall 24f may include a spring-loaded clip 36 pressing the rear wall 24f away from the rear of the smart phone 12 to pull the light tight compartment 26 tightly against the front of the smart phone 12 to minimize light leakage into the compartment 26. Those portions of the housing 16 contacting the front of the smart phone 12 or otherwise surrounding the slot 18 may include an elastomeric material or fabric (not shown) to further prevent light leakage into the compartment 26.

The optical axis 30 of the camera lens 22 may be centered vertically and left to right in the compartment 26, for example, by adjustable shim elements 32 attached to the top wall 24a and sidewalls 24b and 24c, thereby accommodating variations in camera placement and cell phone housing size. As depicted in FIG. 2, one example of the shim elements 32 may be nylon set screws that may be adjusted in and out of the corresponding walls to provide this centering. Other possible shimming techniques are also contemplated. Portions of the housing 16 may be removed to permit the camera lens 22 to be viewed during this process. Referring now to FIGS. 1 and 3, an inner surface of the front wall 24d may support a light source 38 such as an LED providing a broadband light output, for example, through multiple LED-contained emitters (e.g., red, green, and blue) or preferably through the use of a phosphor together with a blue or ultraviolet LED. The light source 38 may be a multispectral light source providing continuous light over an entire visible light spectrum (400-650 nm) such as incandescent and halogen bulbs.

This light source 38 is directed rearward along the optical axis 30 to pass through an interference filter 40 held in a removable tray 42 that may fit within a slot 46 in sidewall 24b. Typically the invention will provide for multiple such interference filters each providing for a different narrow passband of light (that is a single light "color" or selected light "colors" such as red, green and blue). The interference filter 40 may also be replaced with a colored film to reduce costs. In an alternative embodiment, sample holder 44, described below, may have colored walls that replace the interference filter 40 or colored film. In yet another embodiment, the interference filter 40 may be omitted altogether.

Light passing through the interference filter 40 may then be received through the transparent walls of a sample holder 44 holding, for example, a liquid suspension of a solute material 45 in solution at an unknown concentration to be determined. The sample holder 44 may be received into the adapter 14 along the optical axis 30 through an opening 50 in upper wall 24a of the housing 16 and may provide for a transparent lower container portion sealed by an upper light opaque cap interacting with a shroud 51 to reduce light leakage through the opening 50 when the sample holder 44 is in place. Preferably the walls of the sample holder 44 provide parallel planar front and rear surfaces positionable perpendicular to the optical axis 30 to minimize reflection and maximize transmission through the sample holder 44.

An electrical button switch 52 on upper wall 24a of the adapter 14 may be pressed to activate the light source 38 to provide a beam of light through the interference filter 40 and the material 45 in the sample holder 44 to be received through lens 22 of the camera of the smart phone 12 for measurement by the smart phone camera. In this regard the electrical button switch 52 may connect power from self-contained batteries 53, for example, fitting within a battery compartment 57 in the housing 16 as held beneath a cover 59. This button switch 52 may also communicate with the smart phone 12, for example, by means of an electrical connection with a smart phone connector or the like or by other means, for example, by simulating a touching on a screen of the smart phone 12, in order to activate a program for absorption measurement as will be discussed below.

Figure 4:
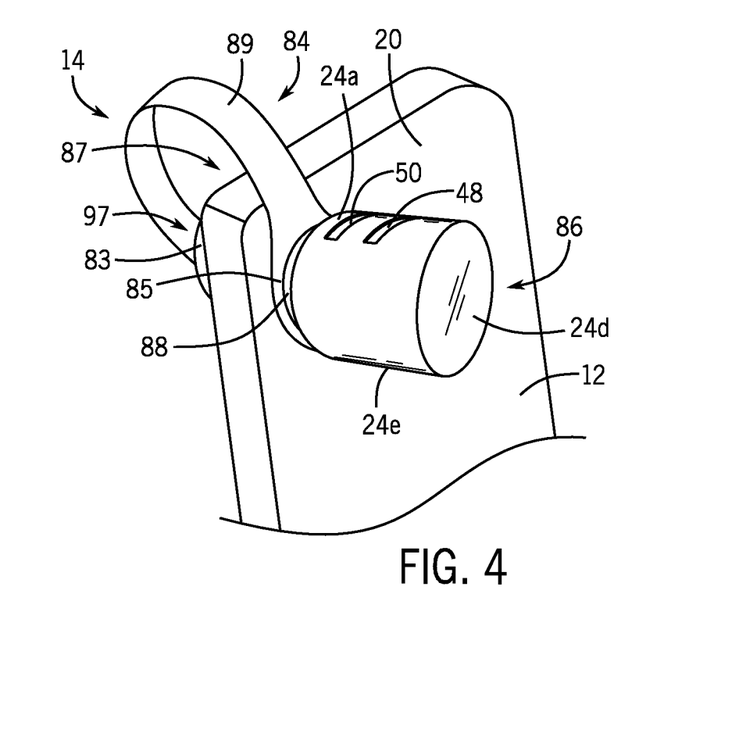
FIG. 4 is a partial perspective view of an example smart phone fitted with an alternative embodiment of the colorimeter accessory of the present invention with the sample holder and interference filter removed.

Referring now to FIG. 4, an alternative embodiment of the adapter 14 may provide a "clip-on" style attachment having a mounting clip 84 including two generally parallel sides extending on parallel sides of the smart phone 12. A first side 83 extends along the rear face of the smart phone 12 while a second side 85 extends along the front face of the smart phone 12. The first side 83 and second side 85 contact the two generally parallel faces of the smart phone 12. The first side 83 and second side 85 are pulled tightly toward each other by a U-shaped or arcuate band 89 extending between the first side 83 and second side 85 and providing a gap 87 spanning between the first side 83 and second side 85 to receive the upper end 20 of the smart phone 12. The band 89 is preferably comprised of material exhibiting spring-like or resilient characteristics such that it will tend to maintain the "U" or arcuate shape into which it has been formed. The band 89 may also be spring based so that the first side 83 and second side 85 are pulled inward to contact the smart phone 12.

The first side 83 of the clip 84 may include a gripping material or pad 97 of increased friction contacting the outer surface of the smart phone 12a, such as a rubber pad or other gripping material, to aid in the securement of the housing 16 to the smart phone 12 and prevent scratching the outer surface of the smart phone 12a. The first side 83 may also have a small and narrow form factor so as to not obscure the display of the outer surface of the smart phone 12a. For example, the first side 83 may only extend less than 1 inch or less than 0.5 inches from the upper edge of the smart phone 12 and extend less than 1 inch or less than 0.5 inches between the left and right edges of the smart phone 12. The first side 83 may also be nonconductive so that contact of the first side 83 to a touch screen display does not register as a user's touch.

The second side 85 may carry a cylindrical housing 86 extending over the camera lens 22 and tightly engaging with the front face of the smart phone 12, for example, by a gasket material such as an O-ring 88 sealing the cylindrical housing 86 and the front face of the smart phone 12. The cylindrical housing 86 has a large enough diameter or outer dimension to surround camera lens 22 or otherwise seal the gap between the cylindrical housing 86 and the front face of the smart phone 12. The O-ring 88 is sized accordingly to engage an outer diameter of the cylindrical housing 86.

Unlike the embodiment shown in FIGS. 1-3, the mounting clip 84 may be centered on the camera lens 22 without the housing 16 having to extend to left and right edges of the smart phone 12 thereby accommodating variations in camera placement and cell phone housing size without shim elements 32. Moreover, the attachment of the mounting clip 84 automatically adjusts the light source 38, interference filter 40, and sample holder 44 to align with the left-right placement of the optical axis 30 of the camera lens 22 on the smart phone 12.

Figure 5:
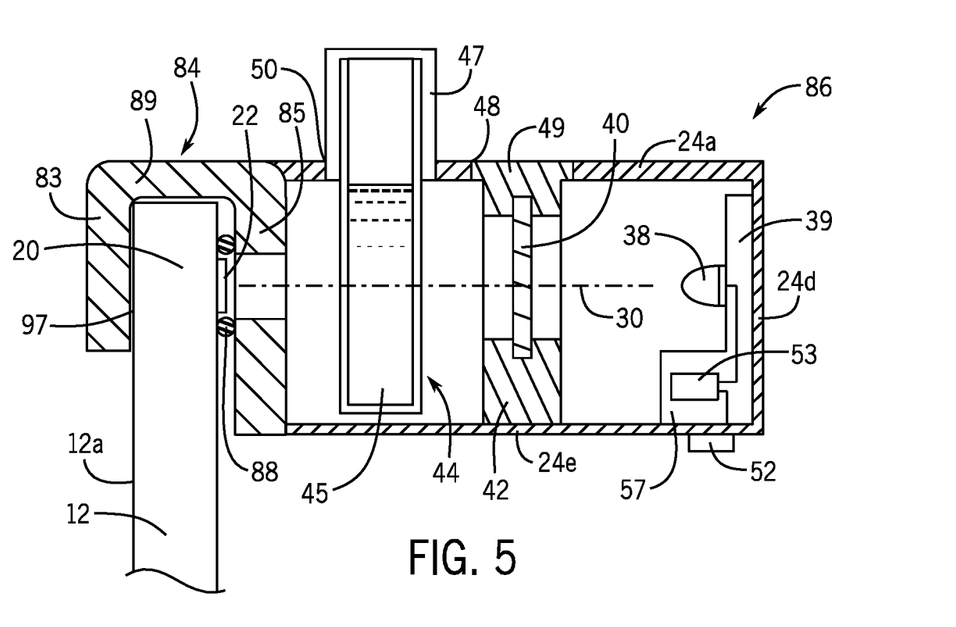
FIG. 5 is a schematic structural diagram showing the colorimeter accessory of FIG. 4 used on a smart phone of the present invention with the sample holder and interference filter installed.

Referring now to FIG. 5, a schematic diagram of the adapter 14 shown in FIG. 4 is provided but may also represent a wide variety of "clip-on" style attachments. For example, the mounting clip 84 may be a spring clip or other type of compressive clip spanning between the front face and rear face of the smart phone 12 at an upper end 20 of the smart phone 12 to support the clip on the smartphone 12. The second side 85 of the mounting clip 84 engaging with the front face of the smart phone 12 may support the housing 86 proximate the camera lens 22. Although the housing 86 is shown as a cylindrical housing in FIG. 4, the housing 86 can be any shape and size including a rectangular shaped housing.

In most respects, the housing 86 of the alternative embodiment shown in FIGS. 4 and 5 may be similar to the embodiment shown in FIGS. 1-3 described above with respect to housing 16. The housing 86 may carry a light source 38, such as a single LED, supported by a light module 39 and having a battery compartment 57 storing self-contained batteries 53 for powering the light source 38. A cover of the battery compartment 57 may be removed to allow the batteries 53 to be replaced. Alternatively, the light source may also be powered by a utility grid connected to the light source 38 through an electrical connector (not shown).

The light source 38 passes light along the optical axis 30 through the interference filter 40 as previously described and through the liquid suspension of a solute material 45 received through the transparent walls of the sample holder 44 as described above. Exterior to the housing 86 and optionally extending partially within the housing 86, the sample holder 44 may be covered by a dark colored, opaque rectangular cover 47 to prevent light leakage through the opening 50 from the surroundings. The cover 47 is substantially sized and shaped to fit over the upper portion of the sample holder 44. The interference filter 40 may also be installed through an opening 48 of the upper wall 24a of the housing 86 with an upper cover 49, which may be slid or closed over the opening 48, preventing light leakage from entering the opening 48 from the surrounding. It is understood that the sample holder 44 and interference filter 40 may be readily replaced from the housing 86 as needed for measurement.

Figure 6:
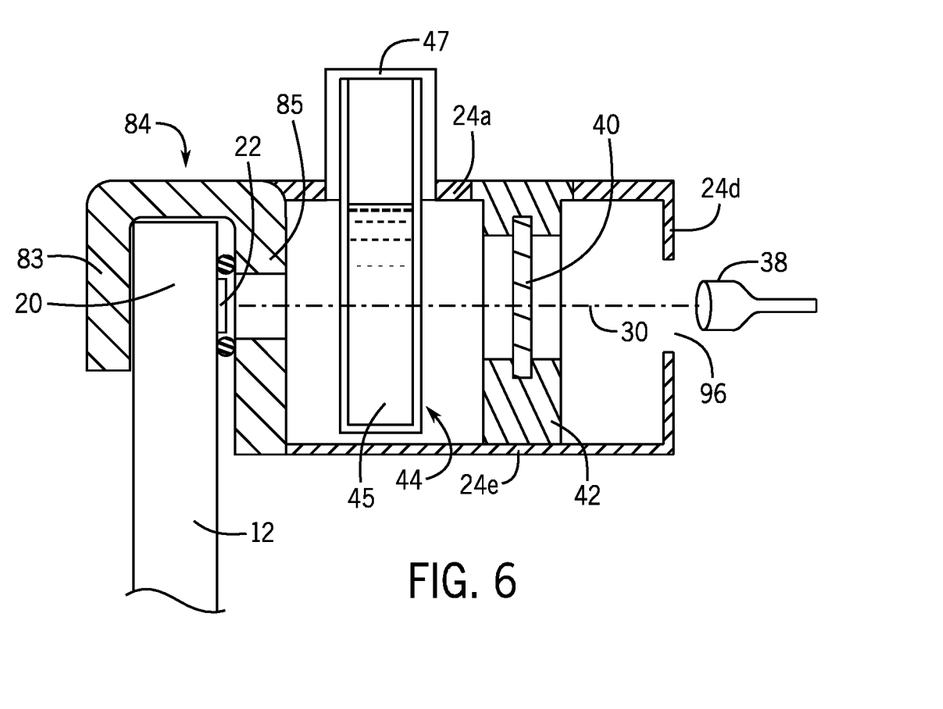
FIG. 6 is a simplified diagram of an alternative embodiment of the colorimeter accessory using an exterior light source to supply light through the accessory.

Referring to FIG. 6, in an alternative embodiment, the light source 38 may be an external source to the adapter 14 and not a light source 38 carried by the housing 16, 86 as previously described. For example, the light source 38 may come from ambient or natural light from the environment. In another example, the light source 38 may come from an artificial light source, such as a light bulb or a flashlight 92. The flashlight 92 may be the built-in LED flash on a front face of the smart phone 12 that is diverted, such as through a light pipe or angled mirrors, to provide light at a desired angle and location.

The mounting clip 84 may help to keep an alignment between the light source 38, sample holder 44, interference filter 40, and smart phone 12, such that light from the exterior light source 38 is directed along the optical axis 30 and the path length of light through the sample remains consistent. In order to facilitate the light source 38 being directed along the optical axis 30, the front wall 24d may include a constricted opening 96 centered on the optical axis 30 so that the user may direct the light source 38 into the opening 96 along a path of the optical axis 30.

In all embodiments described above, the light source 38 may be incandescent, compact fluorescent, full spectrum LED, multiple specific wavelength LEDs, or a combination of light source types. Depending on the type of light source, the power requirements can be determined for run time, size and style.

Figures 7, 8A, 8B:
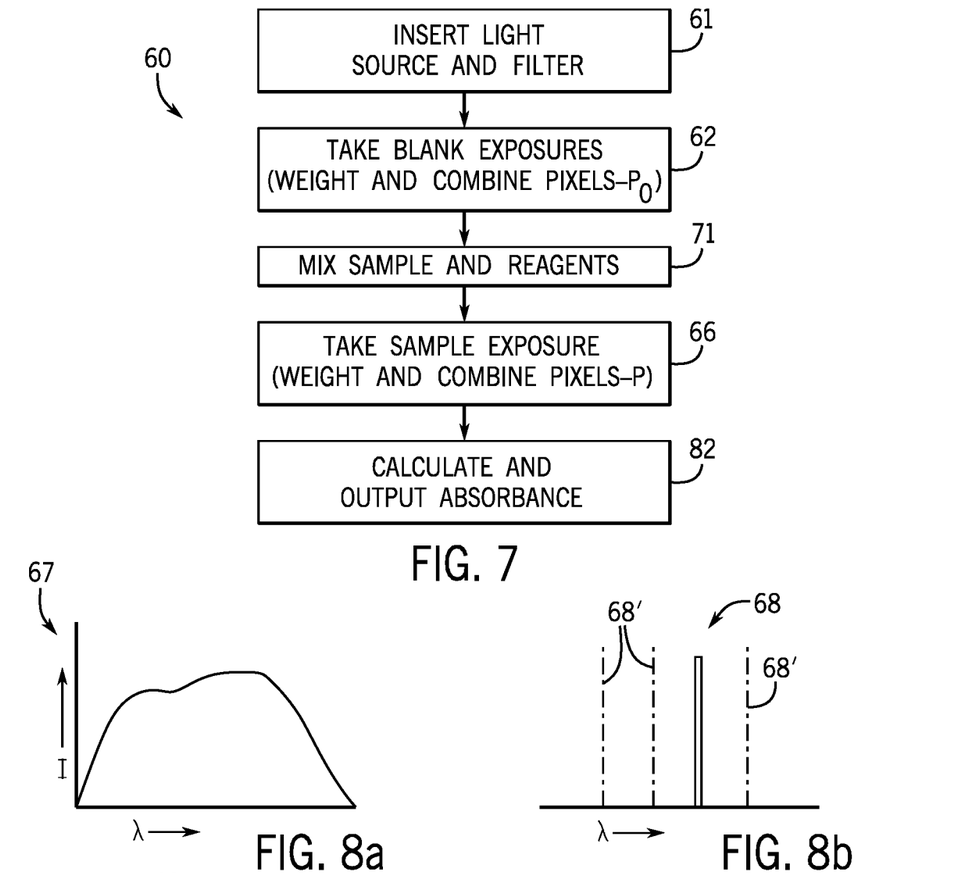
FIG. 7 is a flowchart of a program executed by the smart phone for performing calibration and concentration calculations.
FIGS. 8a-8d are charts depicting the spectrum of the contained light source, the frequency passband of the interference filter, the spectral sensitivity of the camera phone for different color channels, and an example intensity curve for one camera color channel.

Referring now to FIG. 7, a program 60 executable as an application by the smart phone 12 may provide instructions to the user to turn on or insert the light source 38 and insert the interference filter 40 into the adapter 14 as indicated by process block 61.

The program 60 may then provide instruction to the user to take a blank exposure as indicated by process block 62. During this blank exposure acquisition, the user inserts a sample holder 44 without the solute 45 to be measured (for example, being filled only with distilled water) into the opening 50. A measurement of light transmitted through the sample holder 44 is then made by the smart phone 12 to provide a calibrating reading that may be used to correct for changes in the intensity of the light source 38 and sensitivity of the camera and the like as will be described.

Optionally, this blank exposure may also be used to identify the particular filter 40 in place in the adapter 14, for example, by analyzing relative intensities of the light sensed in the different color channels of the smart phone camera according to a predetermined filter signature stored by the program 60.

A particular material (reagent or reagents) being analyzed may optionally be entered by the user such as may be used in a subsequent calculation to be described.

At process block 66, a second exposure is taken after a second sample holder 44 is placed in housing 16, the second sample holder 44 containing both the solvent (e.g., water) and a colored solute 45 of concentration to be determined. Optionally, the reagent or reagents have also be added to the second sample holder 44 by the user.

It is understood that the second sample holder 44 may be consistently filled to the same amount or height for all measurements or may be filled to a height so that the light path passes through the solvent and the colored solute 45 when inserted into the adapter 14.

Referring now to FIG. 8a, the light source 38 will produce an output spectrum 67, for example, providing different intensities at different frequencies being a function of the construction of the light source 38 and its phosphor. A narrow band of frequencies 68 as shown in FIG. 8b may be selectively passed by the interference filter 40 having an intensity determined largely by the spectrum 67 and the transmission qualities of the interference filter 40. A variation in intensity as a function of the selection of different filters 40 usable with the invention (shown by dotted lines 68') will largely be accounted for by the process of comparing the second exposure of process block 66 to the blank exposure at process block 62 but also may be subject to a separate calibration step as will be described.

Figure 8C:
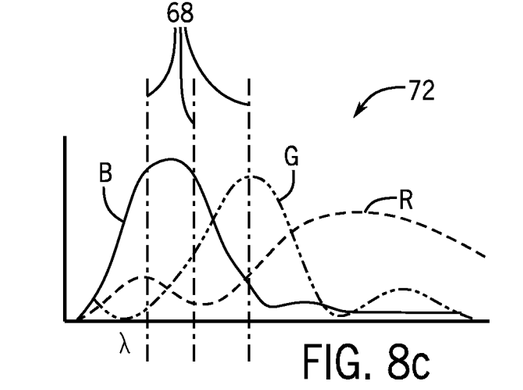

The narrow band of frequencies 68 selected by a particular filter 40 after passing through the sample holder 44 will be sensed by the camera of the smart phone according to where it falls on a response curve 72 (shown in FIG. 8c). This response curve 72 is a function of the red, green, and blue sensitivities of the filters on sensing pixels of the color camera defining three different color channels. For a particular band of frequencies 68, a sensitivity of each of the channels (red, green, or blue) of the camera may be determined and used in a calibration process to be described.

Figure 8D:
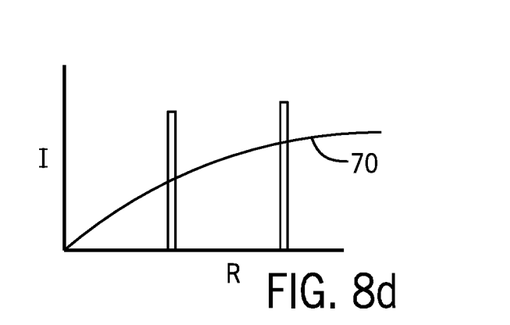

Referring to FIG. 8d, in one embodiment, the intensity response 70 of each of the channels of the camera (being a function relating received light fluence to electrical camera output) may have a nonlinearity which may be determined (for example, empirically) for each color channel. Using the information of each of FIGS. 8a-8d, a weighing and combination step may be performed in which a calibrated intensity value is determined for each of the intensity measurements of process blocks 62 and 66. This calibration process may, for example, determine, based on the known filter 40 and the predetermined response curve 72 for each of the color channels, a weighting value necessary to normalize each of these intensity measurements. The normalized intensity measurements may then be corrected according to the intensity response 70 for that particular color channel for each pixel.

In order to reduce noise in the measurement, the corrected values for each of the pixels of each color channel (as corrected above) for a field of view centered within the light received by the camera from the material 45 (for example, in a reduced field of view of the center pixels of the camera) may then be averaged or added together to provide a final intensity value for both the blank exposure of process block 62 and the sample exposure process block 66.

In some embodiments, the known material 45 entered at process block 71 may be used to correct for slight color shifting that can occur by the reagent operating on the finite width of the bandwidth of the band of frequencies 68 (for example, such as tends to shift the hue of the received light into a different region of sensitivity of the response curve 72).

Once corrected intensity values are obtained for the measurements of process blocks 62 and 66, these intensity values may be used to compute an absorbance 80 according to the Beer-Lambert law and the following equation:

$$A = -\log(P/P_0) = -\log T$$

where A is absorbance, P is the measurement at process block 66 (as corrected), $P_0$ is the measurement at process block 62 (as corrected), T is transmittance of light calculated as $P/P_0$.

The absorptivity $\epsilon$ is a constant that is specific to the material 45 at the wavelength provided by the filter 40 and may be determined based on the entered material at process block 71. This absorptivity may then be used to determine a concentration of the material 45 according to the following equation:

$$A = \epsilon b C$$

where A is the absorbance determined above, b is a path length through the sample holder 44 along the optical axis 30, and C is a concentration of the material 25 in the sample. The value of b may be entered into or fixed in the program 60 based on the known size of the sample holder 44 and the value of $\epsilon$ entered into the smart phone or deduced, for example, from the input at process block 71 so that the smart phone may perform these calculations to provide an output of concentration C as indicated by process block 82.

It will be appreciated the application program 60 running on the smart phone 12 may further take multiple measurements and plot them, for example, to show changes in concentration over time or do other statistical processing within the capabilities of the smart phone 12.

The adapter 14 may also be used for fluorescence spectroscopy measurement of a fluorescent compound. In this respect, the light source 38 may be a ultra-violet light positioned above the sample holder 44 and allowing UV light to be absorbed and visible light to be emitted by the fluorescent compound solution. The emitted light is then measured by the camera of the smart phone in a manner as previously described above with respect to absorbance.

The adapter 14 may also be used for turbidity measurement of a sample. In this respect, the light source 38 may be positioned above the sample holder 44 and allowing light to be scattered by particles in the solution. The scattered light is then measured by the camera of the smart phone in a manner as previously described above with respect to absorbance and fluorescence. Other alternate configurations for measuring turbidity (e.g., simply measuring the amount of light transmitted through the sample) would also be possible with the adapter 14.

It is understood that adapter 14 may be used with many smart phone types and models and could be interchanged between phones, regardless of the shape, size or layout of the smart phone. The adapter 14 may also be used with many tablet computer types and models and could be interchanged between table computers, regardless of the shape, size or layout of the tablet computer.

It is understood that the adapter 14 may also be used with any high quality digital camera that may be accessed and controlled by an application program that is capable of processing camera pixel data. For example, an embedded laptop camera or external USB camera may be used with the present invention.

The use of the term "colorimeter" herein should be distinguished from this term as used in a system attempting to match colors, for example, of paint samples, according to the perception of the human eye.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A colorimeter accessory for a personal electronic device of a type having a housing with a face carrying a camera lens having an optical axis extending forward from the camera lens comprising:
   an adapter for securing the accessory to the housing of the personal electronic device;
   a lens cover supported by the adapter and surrounding the camera lens to provide a compartment around the camera lens;
   a transparent liquid holder supported by the lens cover and positioned in front of the camera lens along the optical axis;
   an interference filter received into the lens cover and positioned in front of the camera lens along the optical axis; and
   a light source positioned in front of the camera lens, transparent liquid holder and interference filter and introducing light from the light source through the transparent liquid holder along the optical axis.

2. The colorimeter accessory of claim 1 wherein the compartment around the camera lens is sealed against light leakage between the camera lens and the housing.

3. The colorimeter accessory of claim 2 wherein the housing provides an elastomeric material contacting the front face of the personal electronic device to seal the housing surrounding the camera lens.

4. The colorimeter accessory of claim 2 wherein the housing is constructed of an opaque thermoplastic material.

5. The colorimeter accessory of claim 1 wherein the adapter is secured to an edge of the housing of the personal electronic device such that a display screen of the personal electronic device is not obscured.

6. The colorimeter accessory of claim 1 wherein a part of the adapter contacting the personal electronic device is comprised of a nonconductive material.

7. The colorimeter accessory of claim 1 wherein the adapter is adjustably secured to the housing of the personal electronic device vertically between a top and bottom of the personal electronic device and across the personal electronic device from left to right.

8. The colorimeter accessory of claim 1 wherein the adapter is spring loaded to press the lens cover against the front face of the housing of the personal electronic device.

9. The colorimeter accessory of claim 8 wherein the adapter is a rear wall of the lens cover extending downward over a rear face of the personal electronic device and spring loaded to press the lens cover away from the rear face of the housing of the personal electronic device.

10. The colorimeter accessory of claim 8 wherein the adapter is a spring-tensioned clip having a first arm extending downward over a rear face of the personal electronic device and a second arm extending downward over a front face of the personal electronic device and supporting the housing.

11. The colorimeter accessory of claim 10 wherein the first arm provides a gripping pad of material contacting the rear face and to prevent movement between the adapter and the housing of the personal electronic device.

12. The colorimeter accessory of claim 1 wherein the transparent liquid holder provides parallel planar front and rear surfaces positionable perpendicular to the optical axis.

13. The colorimeter accessory of claim 1 wherein the transparent liquid holder is removable through an opening of the housing.

14. The colorimeter accessory of claim 1 wherein the interference filter is removable through an opening of the housing.

15. The colorimeter accessory of claim 1 wherein the light source emits continuous light over an entire visible light spectrum.

16. The colorimeter accessory of claim 1 wherein the housing supports a battery providing power to the light source, the power to the light source controlled by a switch operable to connect and disconnect power to the light source.

17. The colorimeter accessory of claim 1 wherein the personal electronic device is a smart phone having a display, cell phone transceiver circuitry, and battery.

18. The colorimeter accessory of claim 1 further comprising a processor of the personal electronic device executing a stored program stored in memory to receive inputs from the camera lens, and comprising the steps of:
   operating an application program of the personal electronic device stored in a memory to:
   receive a light intensity value for each sensing pixel of the camera lens; and
   average or add together the intensity values of each pixel to produce a final intensity value.

19. A method of determining a concentration of a solute material in solution, the method comprising:
   providing a colorimeter accessory for a personal electronic device of a type having a housing with a face carrying a camera lens having an optical axis extending forward from the camera lens comprising
an adapter for securing the accessory to the housing of the personal electronic device;
a lens cover supported by the adapter and surrounding the camera lens to provide a compartment around the camera lens;
a transparent liquid holder supported by the lens cover and positioned in front of the camera lens along the optical axis;
an interference filter received into the lens cover and positioned in front of the camera lens along the optical axis; and
a light source positioned in front of the camera lens, transparent liquid holder and interference filter and introducing light from the light source through the transparent liquid holder along the optical axis;
securing the adapter on the personal electronic device wherein the housing surrounds the camera lens;
taking a first exposure with the camera lens when the transparent liquid holder is without the solute material to be measured;
taking a second exposure with the camera lens when the transparent liquid holder is filled with the solute material to be measured;
comparing a band of frequencies passed through the interference filter by the first exposure with a band of frequencies passed through the interference filter by the second exposure; and
outputting a concentration of the solute material to the personal electronic device based on the band of frequencies.

20. The method of claim 19 wherein the concentration of the solute material is determined by comparing the band of frequencies through the interference filter to a response curve that is a function of red, green and blue sensitives of the interference filter on sensing pixels of the camera lens.

* * * * *